United States Patent [19]

Tamamori et al.

[11] Patent Number: 4,655,510
[45] Date of Patent: Apr. 7, 1987

[54] SELF-LAPPING TYPE CONTROL VALVE DEVICE

[75] Inventors: Hideo Tamamori; Mitsugu Tsunazawa, both of Kobe, Japan

[73] Assignee: Nippon Air Brake Co., Ltd., Kobe, Japan

[21] Appl. No.: 838,646

[22] Filed: Mar. 11, 1986

[30] Foreign Application Priority Data

Mar. 11, 1985 [JP] Japan .............................. 60-35296[U]

[51] Int. Cl.⁴ .............................................. B60T 15/18
[52] U.S. Cl. .................................... 303/40; 303/36; 303/56
[58] Field of Search ................... 303/28, 33, 35, 36, 303/40, 54, 56

[56] References Cited

U.S. PATENT DOCUMENTS 3,545,820 12/1970 Scott et al. ............................ 303/35
4,375,303  3/1983 Tamamori ............................. 303/40

Primary Examiner—Duane A. Reger
Attorney, Agent, or Firm—G. J. Falce

[57] ABSTRACT

In a self-lapping type control valve device, a check valve is provided by means of a seal at the interface of the control piston diaphragm and a recess in which the diaphragm is connected to the valve body, the seal being effective to isolate a control chamber on one side of the control piston from a constant pressure chamber on the opposite side when the control piston is actuated in response to a reduction in the control chamber fluid pressure to initiate a brake application. This seal is displaced from a ridge at the opening of the recess with which the diaphragm is also engageable when actuation of the control piston occurs in response to a relatively large reduction of the control chamber pressure. The point of engagement of the diaphragm with the ridge defines a pressure area of the diaphragm subject to the control chamber/constant pressure chamber differential that is less than the pressure area of the diaphragm when the diaphragm is disengaged from the ridge due to a lesser pressure differential being effective to actuate the control piston. In so varying the effective pressure area of the diaphragm, the integrity of the seal effect of the check valve is assured at low as well as high brake levels.

5 Claims, 9 Drawing Figures

SELF-LAPPING TYPE CONTROL VALVE DEVICE

FIELD OF THE INVENTION

The invention relates to a self-lapping type control valve which is used in the automatic pneumatic braking system of a railroad car, and in which the pressure in the brake cylinder is controlled as a function of the pressure difference between the internal pressure of the train brake line and the internal pressure of the constant pressure air reservoir.

BACKGROUND OF THE INVENTION

The overall basic design of a self-lapping type control valve, for which the present invention is adapted, is known in the prior art and is described in Japanese Pat. Nos. 57-36185 and 59-19866. The structure described in these patents is illustrated in FIG. 3. With regard to this item, the diaphragm element 2, which is retained by the piston 1 at its inner periphery, is retained at its outer periphery on the main valve body 3; and by means of the diaphragm element 2 and the piston 1, the internal space of the main valve body 3 is divided into the control chamber (a), which is in communication with the brake line BP and the constant pressure chamber (b), which is in communication with the constant pressure air reservoir CR. The constant pressure chamber (b) is connected to the control chamber (a) via the check valve CHV, which establishes one-way flow of fluid pressure from control chamber (a) to constant pressure chamber (b) and cuts off fluid pressure flow in the reverse direction. The main valve body 3 is also equipped with a valve mechanism in which the compressed air route, which is in communication with the brake cylinder BC, is opened or closed by the movement of the piston 1 as a function of the pressure difference between the control chamber (a) and the constant pressure chamber (b). Also provided is a balance piston 51 having a diaphragm element 2 which forms, on one side, an output chamber (c) subject to the brake cylinder pressure; and on the other side, an exhaust chamber (d) having an exhaust outlet which opens to the atmosphere. A supply chamber is provided which is connected with a supply reservoir SR, via a supply valve 54, that is normally engaged with a valve seat 53 by a spring 52. Fixed on the balance piston 51 is an exhaust valve rod 55, one opened end of which is adjacent the above-mentioned supply valve 54, the middle portion of which is open to the exhaust chamber (d), and the other end portion of which penetrates the wall between the exhaust chamber (d) and the control chamber (a) (so that it can slide freely and in an airtight manner), being connected with the above-mentioned piston 1. In operation, when the brake command, namely, the pressure effective in brake line BP, is reduced, only the pressure in the control chamber (a) decreases, because of the operation of the check valve CHV, while the constant pressure chamber (b) is kept at a constant pressure; and as a result of this pressure difference between the control chamber (a) and the constant pressure chamber (b), the piston 1 moves upwardly (as viewed in the drawing) and the exhaust valve rod 55 and the balance piston 51, which are connected to the piston 1, rise. Accordingly, the exhaust valve rod 55 engages and pushes up the supply valve 54 against the force of the spring 52, to separate it from the valve seat 53.

In this manner, the open end of exhaust valve rod 55 is closed while concurrently, the compressed air passage, formed by the supply chamber (e) and the output chamber (c), is opened, and the compressed air in supply reservoir SR flows into the brake cylinder BC. Accordingly, the pressure in the BC increases, and the brake is applied. When the BC pressure reaches a certain pressure corresponding to the pressure difference described above, the balance piston 51 is forced down, and the supply valve 54 with which the exhaust valve rod 55 is already engaged, seats on the valve seat 53; then the supply valve 54, the valve seat 53, and the exhaust rod 55 coact to maintain the brake cylinder pressure constant. This status is the brake-holding status, and the BC pressure is controlled as a function of the pressure-difference described above.

When pressure in brake line BP is increased by the brake-release command, the control chamber (a) is pressurized and the piston 1 moves down, and the exhaust valve rod 55 separates from the valve 54. Therefore, the compressed air in the BC is released into the atmosphere, passing through the output chamber (c), the passage in the exhaust valve rod 55, and the exhaust chamber (d), and the brake is released.

FIG. 4 shows the installation of the piston 1, the diaphragm element 2, and the main valve body 3 in the self-lapping type control valve, and one example in which the check valve is located in the piston 1. The installation of the piston 1, the diaphragm element 2, and the main valve body 3 is as shown in the prior art arrangement of FIG. 3.

In the mating groove 11 which is formed on the outer circumference of piston 1, a projection 21, which is narrower than the mating groove 11 described above, is formed on the inner periphery of the diaphragm element 2, the diameter of which is slightly smaller than the inside diameter of the mating groove 11, so that delta L (the distance between the outer surface end of the piston in the control chamber (a) and the inner wall of the main valve body 3) and delta L' (the distance between the outer surface end of the piston in the constant pressure chamber (b) and the inner wall of the valve main body 3) are minimized.

In this manner, the installation and removal of the diaphragm element 2 (corresponding to the piston 1) is facilitated, since the inner peripheral area of the diaphragm element 2 is fixed to the piston 1 without bolts, etc.

Following is an explanation of the check valve CHV, which is illustrated in FIG. 4. In this check valve CHV on the cylindrical hub 12, which is formed at the center of the piston 1 and which has a bottom surface, the throttle hole 13 (the inner portion of which is in communication with the constant pressure chamber (b)) is cut; and on the lower end of the exhaust valve rod 55 which is fitted into the cylindrical hub 12, there is a rubber valve 6 which faces the throttle hole 13 described above. A spring 7, inside the cylindrical hub 12, acts against a flange 57 of the exhaust valve rod 55 having a connecting passage 56 which connects the interior of the cylindrical hub 12 and the control chamber (a). The upper portion of the flange 57 engages a retaining ring 8, which is fitted onto the cylindrical hub 12 to prevent the exhaust valve rod 55 and the cylindrical hub 12 from slipping down. Accordingly, when the pressure is decreased in control chamber (a) in response to the brake command, the piston 1 and its cylindrical hub 12 rise with the diaphragm element 2 against the force of the return spring 4, so that the spring 7 is compressed and the surrounding rim area of the throttle hole 13 is pushed onto the rubber valve 6.

Therefore, fluid pressure communication between the constant pressure chamber (b) and the control chamber (a) is interrupted. This condition is also maintained in the brake-holding state. In response to the brake-release command, the piston 1 and the diaphragm element 2 descend under the force of the increased pressure in the control chamber (a); and as a result of the force of the spring 7, the piston 1 and its cylindrical hub 12 descend in relation to the exhaust valve rod 55; the rubber valve 6 opens the connecting passage 13, and the constant pressure chamber (b) is in communication with the control chamber (a) via the throttle hole 13, the inner space of the cylindrical hub 12, and the connecting passage 56.

Therefore, a lack of pressure, which sometimes occurs in the constant pressure chamber (b), is filled with the compressed air which is supplied from the BP. However, the arrangement illustrated in FIG. 4 requires numerous extra parts, such as, the rubber valve 6, the spring 7, the retaining ring 8, etc., and the design is quite inconvenient.

Also, since it requires the formation of the cylindrical hub 12 on the piston 1 and/or the formation of the flange 57 on the exhaust valve rod 55, the construction of the valve becomes more complicated, which is another disadvantage. Therefore, the arrangement illustrated in FIG. 5 has been suggested.

In the FIG. 5 arrangement, there is a ledge 9 on the wall surface of the control chamber (a) facing the diaphragm element 2. An opening end 101 of the passage 10, which connects, at the other end, with the constant pressure chamber (b), passes through ledge 9 and opens into chamber (a). The bottom end of the exhaust valve rod 55 is fixed on the piston 1 by means of the retaining ring 8.

Accordingly, when fluid pressure in control chamber (a) is decreased in response to the braking command, the piston 1 and the diaphragm element 2 rise against the force of the return spring 4; and as shown in FIGS. 6 and 7, the diaphragm 2 contacts the ledge wall surface 92, which is between the end rim 91 of the ledge 9 and the opening end 101 of the passage 10, so that the opening end 101 is closed and the constant pressure chamber (b) is cut off from the control chamber (a).

Also, when the control chamber (a) is pressurized to obtain a brake release, the piston 1 and the diaphragm element 2 descend, and the diaphragm element 2 separates from the ledge wall surface 92. As shown in FIG. 5, the opening end 101 of the passage 10 opens, and the constant pressure chamber (b) is placed in communication with the control chamber (a) via the passage 10.

FIG. 6 illustrates the case in which the pressure difference between the control chamber (a) and the constant pressure chamber (b) is large; namely, the difference between BP and CR is great (high braking status). FIG. 7 shows the case in which the pressure difference between the control chamber (a) and the constant pressure chamber (b) is small; namely, the difference between BP and CR is low (low braking status).

Let us now consider the sealing ability of the diaphragm element 2 contacting the ledge wall surface 92 in the high-braking status and the low-braking status. In the low-braking status illustrated in FIG. 7, the contact pressure of the ledge wall surface 92 and the diaphragm element 2 is relatively low, so that the seal is weak; therefore, a pressure bleed, due to the backflow of compressed air from CR to BP, tends to occur, thus causing the brake to be inadvertently released. This problem sometimes occurs at the transition between the brake-release status (illustrated in FIG. 5) and the low-braking status (illustrated in FIG. 7). However, it has been discovered that it occurs most often during so-called stepwise or graduated release, in which the BP is pressurized gradually, starting from the high-braking status (illustrated in FIG. 6) and it attempts to maintain the low-braking status (illustrated in FIG. 7). This is because the former is the so-called closing condition, in which the diaphragm element 2 is pulled up with the rising piston (the diaphragm element 2 is rising in the direction to close the opening end 101); but the latter is the so-called opening condition (the condition in which the diaphragm element 2 is descending in the direction to open the opening end 101) in which the diaphragm element 2 loosens from the status where the diaphragm element 2 is strongly pulled up and is stretched to a maximum in the high-braking status. In the low-braking or high-braking status described above, when the pressure in CR is $P_{CR}$ and the pressure in BP is $P_{BP}$, the sealing force F can be determined by Equation (1):

$$F = (P_{CR} - P_{BP}) \times A \times \frac{1}{2} \quad (1)$$

where A is the surface area of the ring-shaped portion of the diaphragm element 2 which corresponds to L', which is the distance between the rim end 91 of the ledge 9 and the contact portion of which the diaphragm element 2 contacts the mating groove 11 of the piston 1 (called the annular surface). However, the force of each spring is eliminated here. In Equation (1), the pressure difference $P_{CR} - P_{BP}$ can be varied, depending on the brake control status; therefore, the cause of the pressure bleed is that the annular surface A is small.

It is possible to enlarge the annular surface A by reducing the outer diameter of piston 1, to make delta L larger. As described in Japanese Pat. No. 58-15735, the diaphragm element 2, which fits into the mating groove 11 of the piston 1, tends to slip out; and at the same time, the diaphragm element 2 must be reinforced, which is not desirable.

OBJECT OF THE INVENTION

The self-lapping type control valve of the prior art has been described above, and it experiences a problem of maintaining a seal in the braking condition. In other words, since the distance L' is designed to be small, the annular surface A in Equation (1) is small; and therefore, it is difficult to obtain a sufficient sealing force F. For that reason, the check valve arrangement in FIGS. 5, 6 and 7 cannot function correctly and the compressed air flows back from the CR to the BP, resulting in the inadvertent release of the brake. Therefore, the object of this invention is to make the sealing force F in Equation (1) sufficient, not by enlarging delta L (the distance between the outer circle of the piston 1 and the inner wall of the main valve body 3) but by enlarging the annular surface A in Equation (1), not only in the transition from the released status to the low-braking status, but also when the high-braking status is gradually released stepwise toward the low-braking status.

BRIEF DESCRIPTION OF THE DRAWINGS

Other objects and attendant advantages will become apparent from the following explanation of the invention, when taken with the accompanying drawings, in which.

DESCRIPTION AND OPERATION

Figure 1:
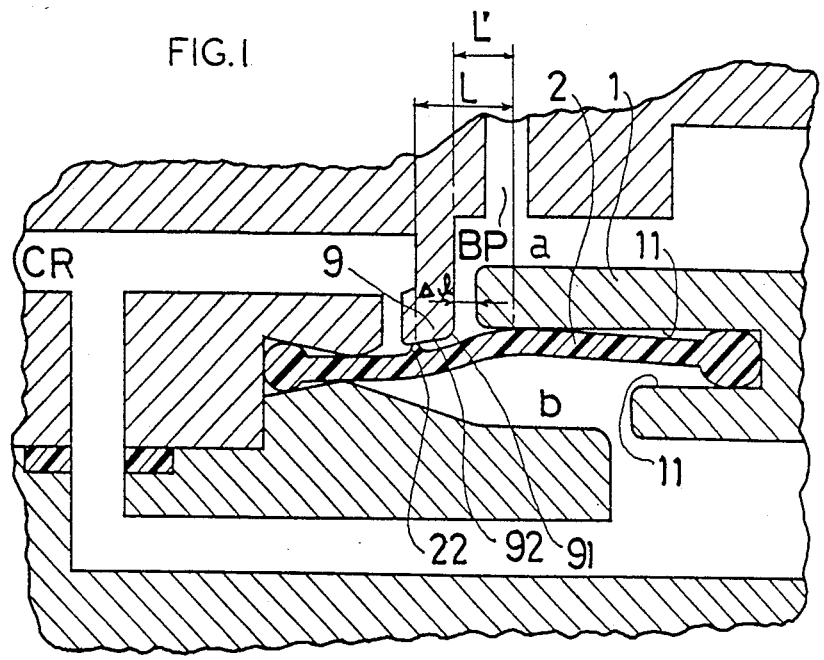
FIG. 1 shows a cross-sectional view of a portion of the control valve device illustrating the diaphragm check valve arrangement in a low-braking status of the control valve in one embodiment of this invention.

In the present invention, the annular surface A in Equation (1) is not the annular surface of the diaphragm element 2, which corresponds to L' (the distance between the rim end 91 on the ledge 9 and the contact portion where the diaphragm element 2 contacts the mating groove 11 of the piston 1) but is the annular surface of the diaphragm element 2, which corresponds to L (the distance between the bead 22 and the contact portion on which the diaphragm element 2 contacts the mating groove 11 of the piston 1). Since L is greater than L', the annular surface A becomes larger than that of the prior art. Therefore, the sealing force F becomes greater. An explanation follows of one embodiment of the invention illustrated in FIGS. 1 and 2.

Figure 2:
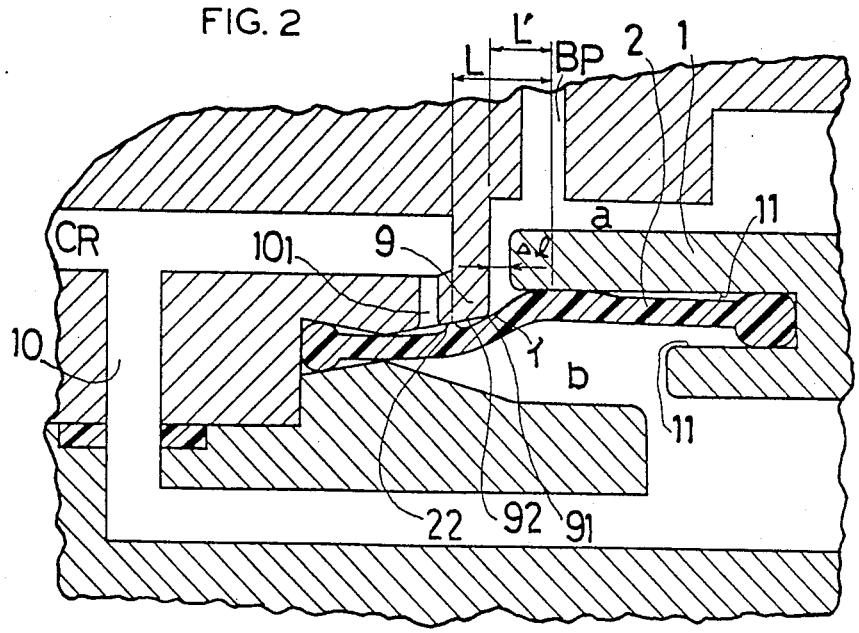
FIG. 2 is a cross-sectional view of a portion of the control valve device illustrating the diaphragm condition in high-braking status of the control valve in another embodiment of this invention.
Figure 3:
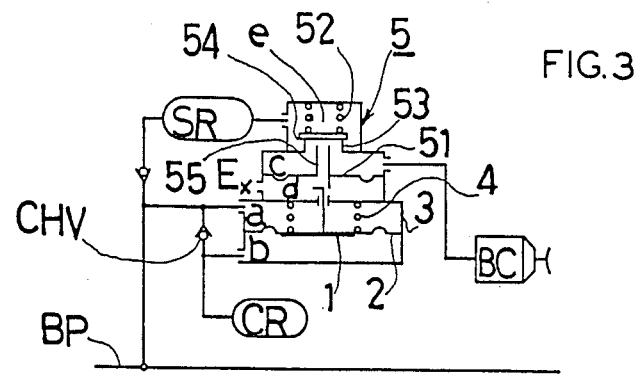
FIG. 3 is a diagrammatic view showing a basic self-lapping type control valve having a check valve external of the control valve device.
Figure 4:
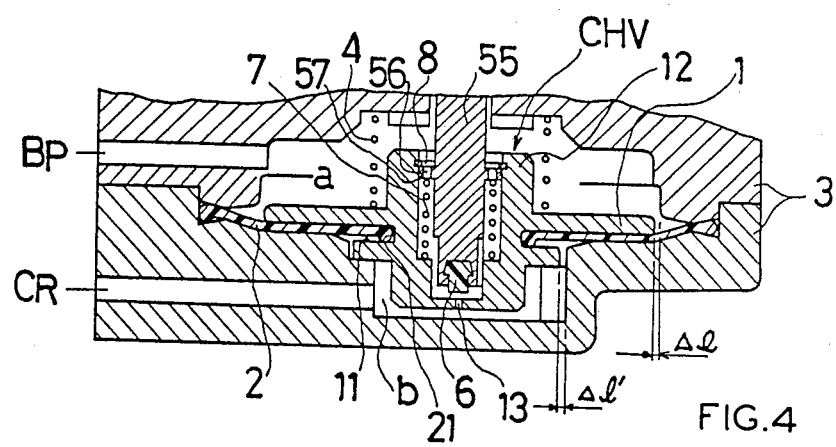
FIG. 4 is a cross-sectional view of a known self-lapping type control valve device having an internal check valve.
Figure 5:
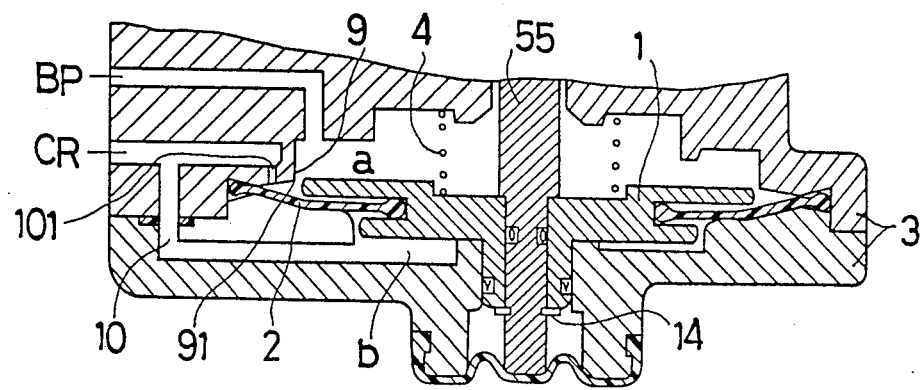
FIG. 5 is a cross-sectional view of the main portion of a self-lapping type control valve of the prior art having a different internal check valve arrangement over which the present invention is an improvement.
Figure 6:
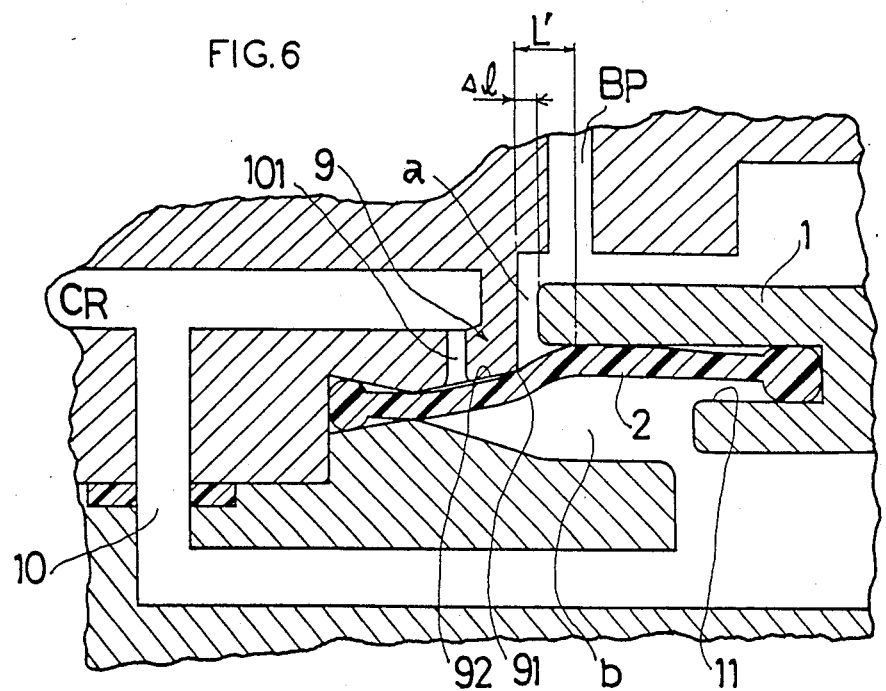
FIG. 6 is a cross-sectional view of the main portion of a self-lapping control valve illustrating the high-braking status of the valve arrangement illustrated in FIG. 5.
Figure 7:
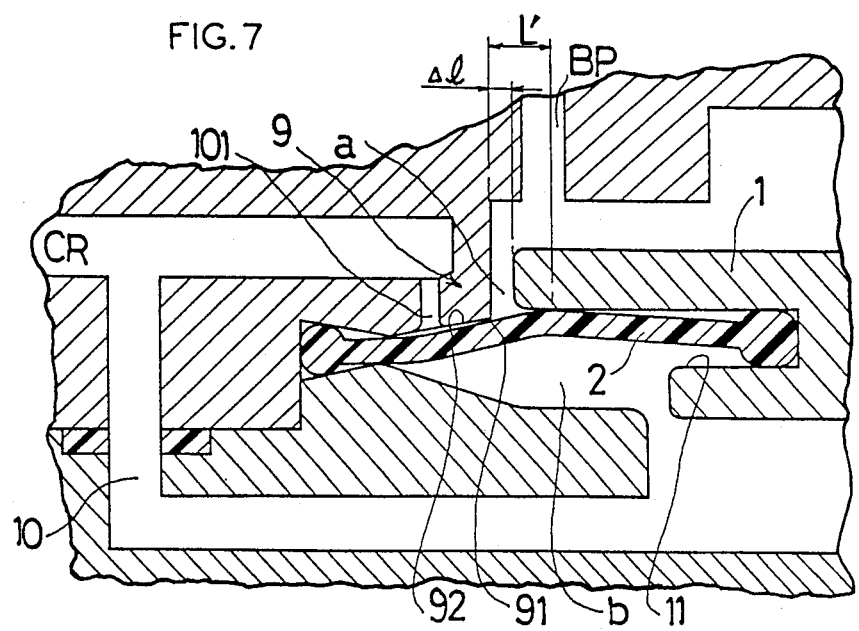
FIG. 7 is a cross-sectional view of the main portion of a self-lapping control valve illustrating the low-braking status of the three-pressure type control valve arrangement illustrated in FIG. 5.

FIG. 1 shows the low-braking status and FIG. 2 shows the high-braking status. In these FIGURES, the instant invention differs from that of the prior art shown in FIGS. 5-7 in that the bead 22 is provided on diaphragm element 2, which contacts or separates from the vicinity of the opening end 101 on the ledge wall surface 92 between the end rim 91 of the ledge 9 and the opening end 101 of the passage 10. In such an arrangement, according to the low-braking status illustrated in FIG. 1, only the bead 22 touches the ledge 9; and as shown in FIG. 2, both the bead 22 and the portion of the diaphragm that is farther inside than the bead 22, contact the ledge 9 in the high-braking status. As is clear, in the low-braking status, the annular surface A in Equation (1) becomes the area of the annular portion of the diaphragm element 2, which corresponds to the distance L, and it is larger than that of the prior art. Therefore, the sealing force F becomes greater than that of the prior art, even if $P_{CR} - P_{BP}$ is small.

In the high-braking status, as shown in FIG. 2, the annular surface A of Equation (1) becomes the same as that of the prior art. In this case, $P_{CR} - P_{BP}$ is large from the beginning, and therefore the sealing force F is sufficient.

When the brake is released gradually in stages from this high-braking status, and to keep it in the low-braking status, the bead 22 is still in contact with the ledge wall surface 92, even though the diaphragm element 2 separates from the rim end 91 of the ledge 9 as a result of the stepwise release. Therefore, it becomes the condition illustrated in FIG. 1, and a sufficient sealing force F can be obtained.

As is clear from the above description in this invention, despite the simple structure of the bead 22 formed on the diaphragm element 2, the constant pressure chamber (b) and the control chamber (a) are positively separated in either of the cases where the brake is in transition from the released status to the low-braking status, and when the brake is released stepwise from the high-braking status and is kept in the low-braking status. Therefore, a high-performance, self-lapping type control valve can be provided that does not suffer from the problem of inadvertent brake release, particularly in the low-braking status.

Figure 8:
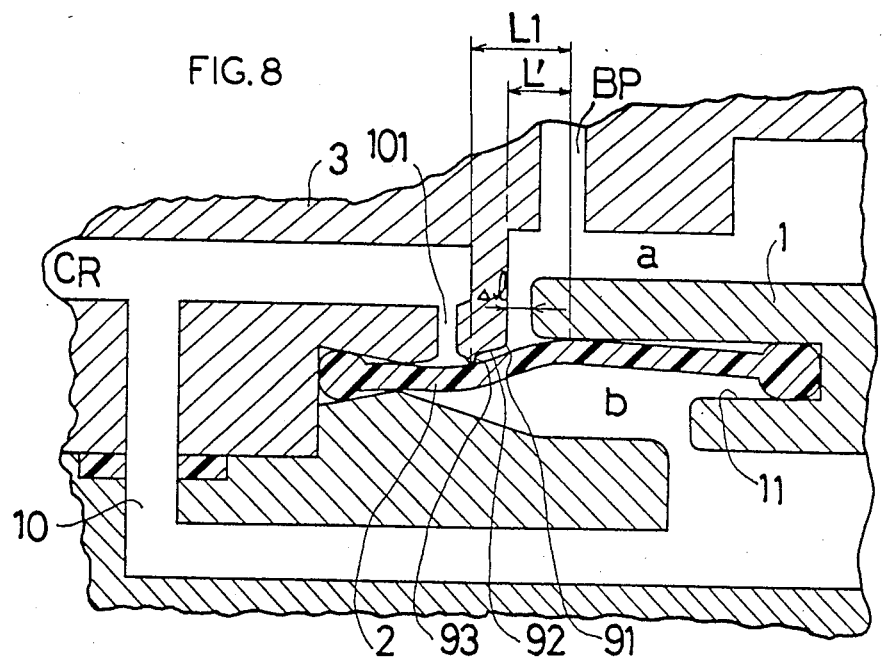
FIG. 8 is a cross-sectional view of the main portion of the control valve device illustrating the diaphragm check valve arrangement of the present invention based on another embodiment.

In the arrangement according to the embodiment illustrated in FIG. 8, an annular projection 93 is formed on the ledge wall surface 92 between the end rim 91 and the opening end 101 of the passage 10. As a result, the annular surface A in Equation (1) becomes the annular surface of the diaphragm element 2, which corresponds to L1 (the distance between the annular projection 93 and the spot in which the diaphragm element 2 contacts the fitting groove 11). Since L is larger than L' (the distance between the rim end 91 of the ledge 9 and the point at which the diaphragm element 2 contacts the fitting groove 11), the annular surface A becomes enlarged and the same effect, as explained in relation to FIG. 1, is obtained.

Figure 9:
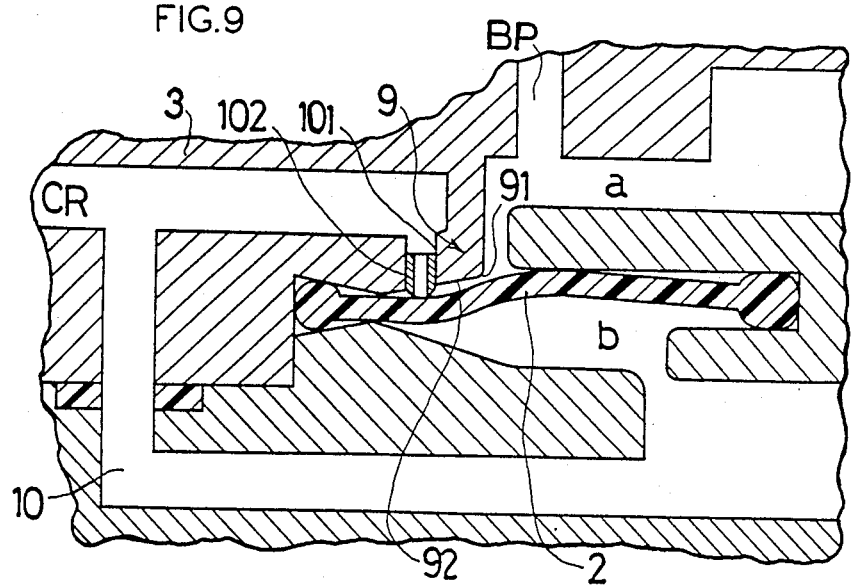
FIG. 9 is a cross-sectional view of the main portion of the control valve device illustrating the diaphragm check valve arrangement of the present invention based on a third embodiment.

In the arrangement according to the embodiment illustrated in FIG. 9, a fluid flow restriction 102 is fixed in the opening end 101 of the passage 10, so that it protrudes into the control chamber (a). The fastening in this case may be accomplished by a press-fit, or by a threaded connection. Also, in this manner, the annular surface A in Equation (1) is enlarged, as explained in the previous embodiments of this invention.

We claim:

1. A self-lapping control valve device having a piston valve assembly for controlling the fluid pressure effective at a delivery port thereof, comprising:
   (a) an opening formed in the body of said control valve device in which said piston valve assembly is operatively-disposed;
   (b) said piston valve assembly comprising:
      (i) a control piston; and
      (ii) an annular diaphragm connected at the inner periphery thereof with said control piston;
   (c) an annular recess in said opening of said body in which the outer periphery of said diaphragm is connected to said body, said recess forming an annular rim at the intersection of said recess and said opening in said body;
   (d) a control chamber formed on one side of said diaphragm;

(e) a constant pressure chamber formed on the opposite side of said diaphragm;

(f) a passageway in said body having one end open to said control chamber within said recess, and the other end open to said constant pressure chamber to establish fluid pressure communication therebetween;

(g) check valve means operable in response to movement of said control piston for controlling fluid pressure communication between said constant pressure chamber and said control chamber, said check valve means including sealing means for effecting a fluid pressure seal between said diaphragm and said recess at a location therealong intermediate said one end of said passageway and said ridge, whereby said one end of said passageway is isolated from said control chamber when said control piston is moved in one direction in response to a reduction of fluid pressure in said control chamber, and said one end of said passageway is communicated with said control chamber when said control piston is moved in the opposite direction in response to an increase of fluid pressure in said control chamber; and (h) said diaphragm being further engageable with said rim, when said control piston is moved in said one direction a predetermined distance in response to a predetermined differential of pressure effective between said control chamber and said constant pressure chamber, thereby establishing a first pressure area of said diaphragm subject to said predetermined pressure differential, said first pressure area being defined by the annular area of said diaphragm between the point of engagement thereof with said rim and said control piston, said diaphragm being disengaged from said rim when said piston is moved in said one direction a distance less than said predetermined distance in response to the differential of pressure between said control chamber and said constant pressure chamber being less than said predetermined pressure differential, thereby establishing a second pressure area of said diaphragm subject to said lesser pressure differential, said second pressure area being greater than said first pressure area and defined by the annular area of said diaphragm between said sealing means and the point of engagement with said control piston.

2. A self-lapping control valve device, as recited in claim 1, wherein said one end of said passageway is formed with a fluid flow restriction.

3. A self-lapping control valve device, as recited in claim 1, wherein said sealing means comprises an annular bead on the side of said diaphragm facing said control chamber that is engageable with and disengageable from the adjacent surface of said recess with movement of said control piston in said one and said opposite directions.

4. A self-lapping control valve device, as recited in claim 1, wherein said sealing means comprises an annular bead on the surface of said recess with which the side of said diaphragm facing said control chamber is engageable and disengageable with movement of said control piston in said one and said opposite directions.

5. A self-lapping control valve device, as recited in claim 2, wherein said sealing means comprises a choke fitting in said one end of said passageway providing said fluid flow restriction, said choke fitting projecting into said recess for engagement with and disengagement from the side of said diaphragm facing said control chamber as said control piston moves in said one and said opposite directions.

* * * * *